(12) United States Patent
Chen

(10) Patent No.: US 7,689,818 B2
(45) Date of Patent: Mar. 30, 2010

(54) METHOD FOR CENTRALIZED DYNAMIC LINK CONFIGURATION

(75) Inventor: Jen-Chieh Chen, Taipei County (TW)

(73) Assignee: Via Technologies, Inc., Taipei (TW)

( * ) Notice: Subject to any disclaimer, the term of this patent is extended or adjusted under 35 U.S.C. 154(b) by 495 days.

(21) Appl. No.: 11/768,948

(22) Filed: Jun. 27, 2007

(65) Prior Publication Data

US 2008/0263351 A1 Oct. 23, 2008

(30) Foreign Application Priority Data

Apr. 17, 2007 (TW) .............................. 96113487 A

(51) Int. Cl.
*G06F 15/177* (2006.01)

(52) U.S. Cl. .................. 713/1; 713/100; 713/320; 713/502; 710/104

(58) Field of Classification Search ................ 713/1, 713/2, 100, 320, 322, 323, 324, 600, 601; 710/104, 305, 306, 307
See application file for complete search history.

(56) References Cited

U.S. PATENT DOCUMENTS

| 6,848,057 B2 * | 1/2005 | Hicok | 713/320 |
| 7,302,512 B1 * | 11/2007 | Currid et al. | 710/268 |
| 7,623,131 B1 * | 11/2009 | Johnson | 345/502 |
| 2007/0234080 A1 * | 10/2007 | Mackey et al. | 713/300 |
| 2008/0126852 A1 * | 5/2008 | Brandyberry et al. | 714/8 |
| 2008/0279104 A1 * | 11/2008 | Chen et al. | 370/235 |

* cited by examiner

*Primary Examiner*—Dennis M Butler
(74) *Attorney, Agent, or Firm*—Thomas, Kayden, Horstemeyer & Risley

(57) ABSTRACT

A method for centralized dynamic link configuration (CDLC), performed by a processor and a chipset is provided. In the method, the processor first notifies the chipset of CDLC enablement. The chipset then issues a command to the processor after receiving notification of CDLC enablement. The processor broadcasts a preparation completion signal after receiving the command. The chipset asserts a signal and activates a timer to start counting after receiving the preparation completion signal. The processor configures devices of the processor, corresponding to a bus, according to one of multiple sets of first link management mode (LMM) configuration parameters in a first LMM register of the processor, indicated by first link management action field (LMAF) code in a first LMAF register of the processor, after detecting that the signal is asserted. The chipset configures devices of the chipset, corresponding to the bus, according to one of multiple sets of second LMM configuration parameters in a second LMM register of the chipset, indicated by second LMAF code in a second LMAF register of the chipset, when asserting the signal. The chipset de-asserts the signal when the timer reaches a predetermined value.

20 Claims, 8 Drawing Sheets

| Bits | Property | Definition | Description |
|---|---|---|---|
| 4:1 | RW | 1 | Lmaf [3:0] |
| 0 | RW | 0 | Enabling CDLC |

FIG. 6

METHOD FOR CENTRALIZED DYNAMIC LINK CONFIGURATION

BACKGROUND

The invention relates to power management, and more particularly, to methods and systems for centralized dynamic link configuration (CDLC).

The HyperTransport™ Technology Consortium (HTC) has introduced the HT3 specification containing a new centralized link management control (CLMC) feature. The CLMC can dynamically configure device specific link features that affect link power consumption through link management SM commands and an associated LDTSTOP# assertion event for synchronization. Link management SM commands contain a 4-bit link management action field (LMAF). The LMAF code is used for indexing BIOS-programmable link management mode (LMM) registers. Details of the HT3 may refer the specification HTC20051222-0046-0008, entitled *HyperTransport™ I/O Link Specification Revision* 3.00, established on Apr. 21 2006.

SUMMARY

A method for centralized dynamic link configuration (CDLC), performed by a processor and a chipset, comprises the following steps. The processor notifies the chipset of CDLC enablement. The chipset issues a command to the processor after receiving the notification of CDLC enablement. The processor broadcasts a preparation completion signal after receiving the command. The chipset asserts a signal and activates a timer to start counting after receiving the preparation completion signal. The processor configures devices of the processor, corresponding to a bus, according to one of multiple sets of first link management mode (LMM) configuration parameters in a first LMM register of the processor, indicated by first link management action field (LMAF) code in a first LMAF register of the processor, after detecting that the signal is asserted. The chipset configures chipset devices corresponding to the bus according to one of multiple sets of second LMM configuration parameters in a second LMM register of the chipset, indicated by second LMAF code in a second LMAF register of the chipset when asserting the signal. The chipset de-asserts the signal when the timer reaches a predetermined value.

An embodiment of a system for CDLC comprises a processor and a chipset connecting to the processor via a bus. The processor comprises a first LMAF register storing, a first LMM register, and an arithmetic logic unit. The first LMAF register stores a first LMAF code. The first LMM register stores multiple sets of first LMM configuration parameters. The arithmetic logic unit, coupling to the first LMAF register and the first LMM register, loads and executes a computer program. The chipset comprises a timer, a second LMAF register, a second LMM register, and a system management controller (SMC). The second LMAF register stores a second LMAF code. The second LMM register stores multiple sets of second LMM configuration parameters. The SMC couples to the timer, the second LMAF register and the second LMM register. The computer program notifies the SMC of CDLC enablement. The SMC issues a command to the computer program after receiving the notification of CDLC enablement. The computer program broadcasts a preparation completion signal after receiving the command. The SMC asserts a signal and activates the timer to start counting after receiving the preparation completion signal. The computer program configures devices of the processor, corresponding to the bus, according to one of multiple sets of first LMM configuration parameters in the first LMM register of the processor, indicated by first LMAF code in the first LMAF register of the processor after detecting that the signal is asserted. The SMC configures devices of the chipset, corresponding to the bus, according to one of multiple sets of second LMM configuration parameters in the second LMM register of the chipset, indicated by second LMAF code in the second LMAF register of the chipset when asserting the signal. The SMC de-asserts the signal when the timer reaches a predetermined value.

BRIEF DESCRIPTION OF DRAWINGS

The invention will become more fully understood by referring to the following detailed description with reference to the accompanying drawings, wherein:

FIG. 6 is a diagram illustrating the data format of an embodiment of a link management SM command;

DETAILED DESCRIPTION

Figure 1:
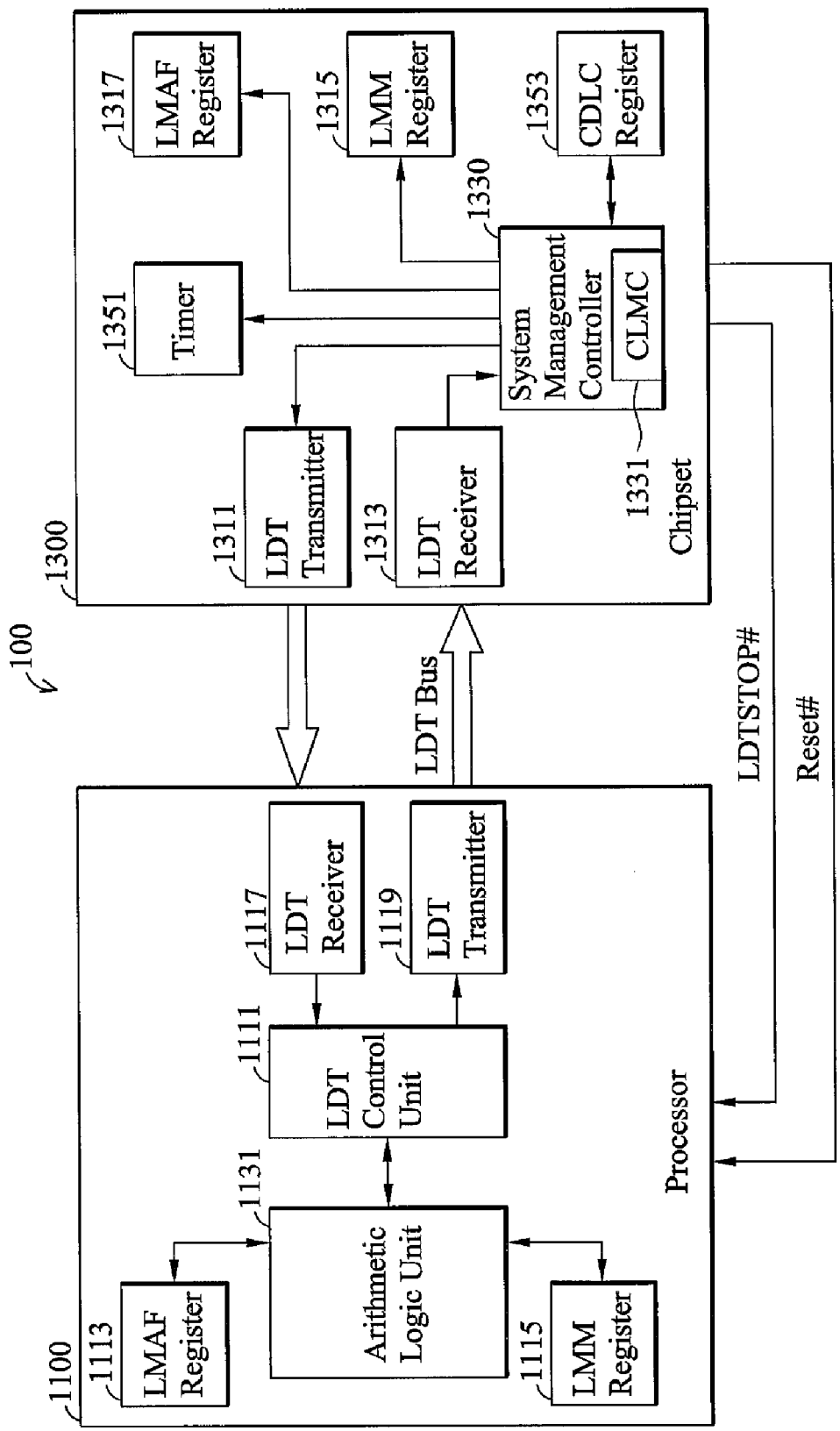
FIG. 1 is a diagram of a hardware environment of an embodiment of a CDLC system.

The Lightning Data Transport (LDT) bus is a bidirectional serial/parallel high-bandwidth, low-latency computer bus. Buses of various widths can be mixed together into a single application (for example, 2×8 instead of 1×16), which allow for higher speed interconnects between main memory and a processor, and lower speed interconnects among peripherals as appropriate in order to reduce power consumption. FIG. 1 is a diagram of a hardware environment of an embodiment of a CDLC system 100, comprising a processor 1100 and a chipset 1300. The chipset 1300 typically performs operations of the conventional north-bridge and south-bridge. The north-bridge, a controller, transmits/receives data to/from the processor 110 via the LDT bus.

The processor 1100 comprises an arithmetic logic unit 1131, a LDT control unit 1111, a LDT receiver (Rx) 1117, a LDT transmitter (Tx) 1119, a link management action field (LMAF) register 1113, and a link management mode (LMM) register 1115. The chipset 1300 comprises a system management controller (SMC) 1330, a LDT transmitter (Tx) 1311, a LDT receiver (Rx) 1313, a LMM register 1315, a LMAF register 1317, a timer 1351, and a CDLC register 1353. Data is transmitted between the arithmetic logic unit 1131 and the chipset 1300 via the LDT bus. LDT control unit 1111 receives data from the chipset 1300 via the LDT receiver 1117, and transmits data to the chipset 1300 via the LDT transmitter 1119. The SMC 1330 receives data from the processor 1100 via the LDT receiver 1313, and transmits data to the processor 1100 via the LDT transmitter 1311. The communication between the processor 1100 and the chipset 1300 may employ Gen1 or Gen3 protocol. Gen1 protocol is typically applied in a working environment under 1 GHz, and Gen3 protocol is typically applied in a working environment over 1 GHz. The SMC 1330 comprises a centralized link management controller (CLMC) 1331 to perform CLMC functions. The LDT receivers 1117 and 1313, and the LDT transmitters 1119 and 1311 have sixteen pins (2×8 pins) respectively.

Figure 2:
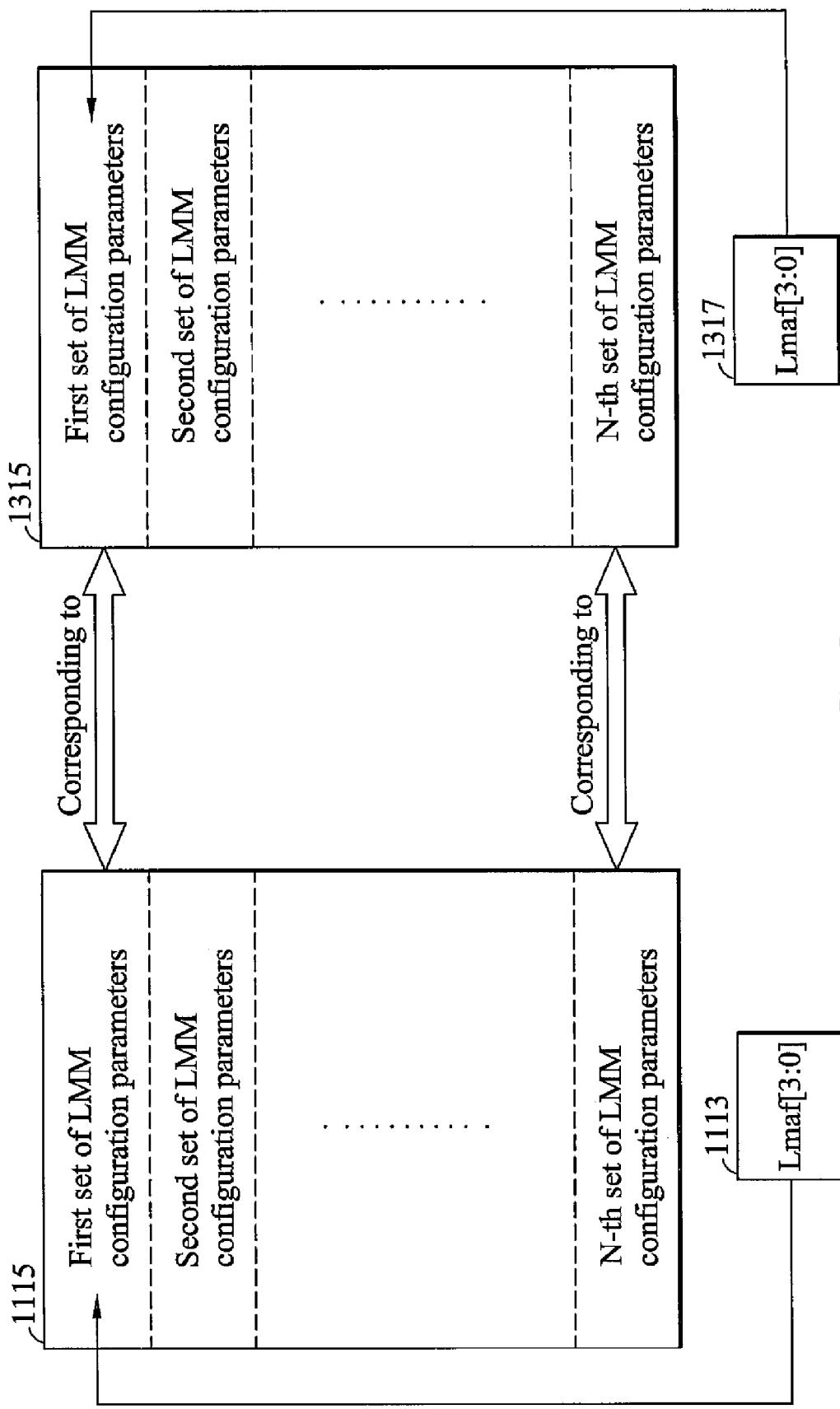
FIG. 2 is a diagram illustrating an embodiment for selecting LMM configuration parameters.

The LMM register 1115 stores n sets of LMM configuration parameters, and LMM register 1315 also stores n sets of corresponding LMM configuration parameters. FIG. 2 is a diagram illustrating an embodiment for selecting LMM configuration parameters. Each set of LMM configuration parameters stored in the LMM register 1115 is employed to configure devices corresponding to the LDT bus (including the LDT control unit 1111, LDT receiver 1117, LDT transmitter 1119, or others), and control parameters (including T0tmr, or others). For example, a lane state of a set of pins of the LDT receiver 1117, or the LDT transmitter 1119, may be configured to one of a plurality of statuses, such as off, standby, or others. The LMAF register 1113 stores a LMAF code (Lmaf[3..0]) establishing an index with reference to a particular set of LMM configuration parameters in the LMM register 1115. Each set of LMM configuration parameters stored in the LMM register 1315 is employed to configure devices corresponding to the LDT bus (including the CLMC 1331, LDT receiver 1313, LDT transmitter 1311, or others), and control parameters (including T0tmr, or others). For example, a lane state of a set of pins of the LDT receiver 1313, or the LDT transmitter 1311, may be configured to one of a plurality of statuses, such as off, standby, or others. The LMAF register 1317 stores a LMAF code (Lmaf[3..0]) establishing an index with reference to a particular set of LMM configuration parameters in the LMM register 1315.

Figure 3A:
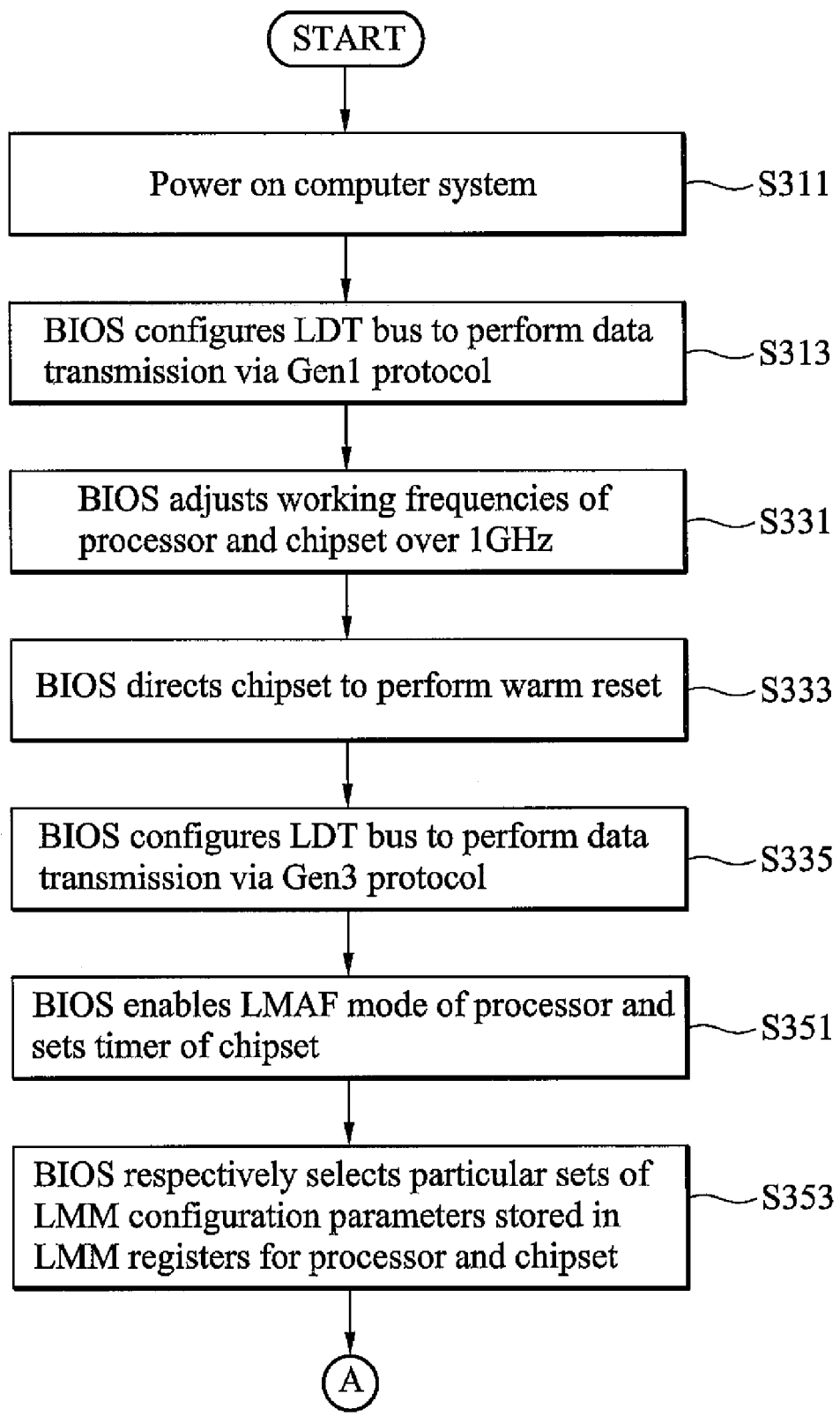
FIGS. 3A and 3B are flowcharts illustrating an embodiment of a method for CDLC, performed in a power on self test (POST) stage.
Figure 3B:
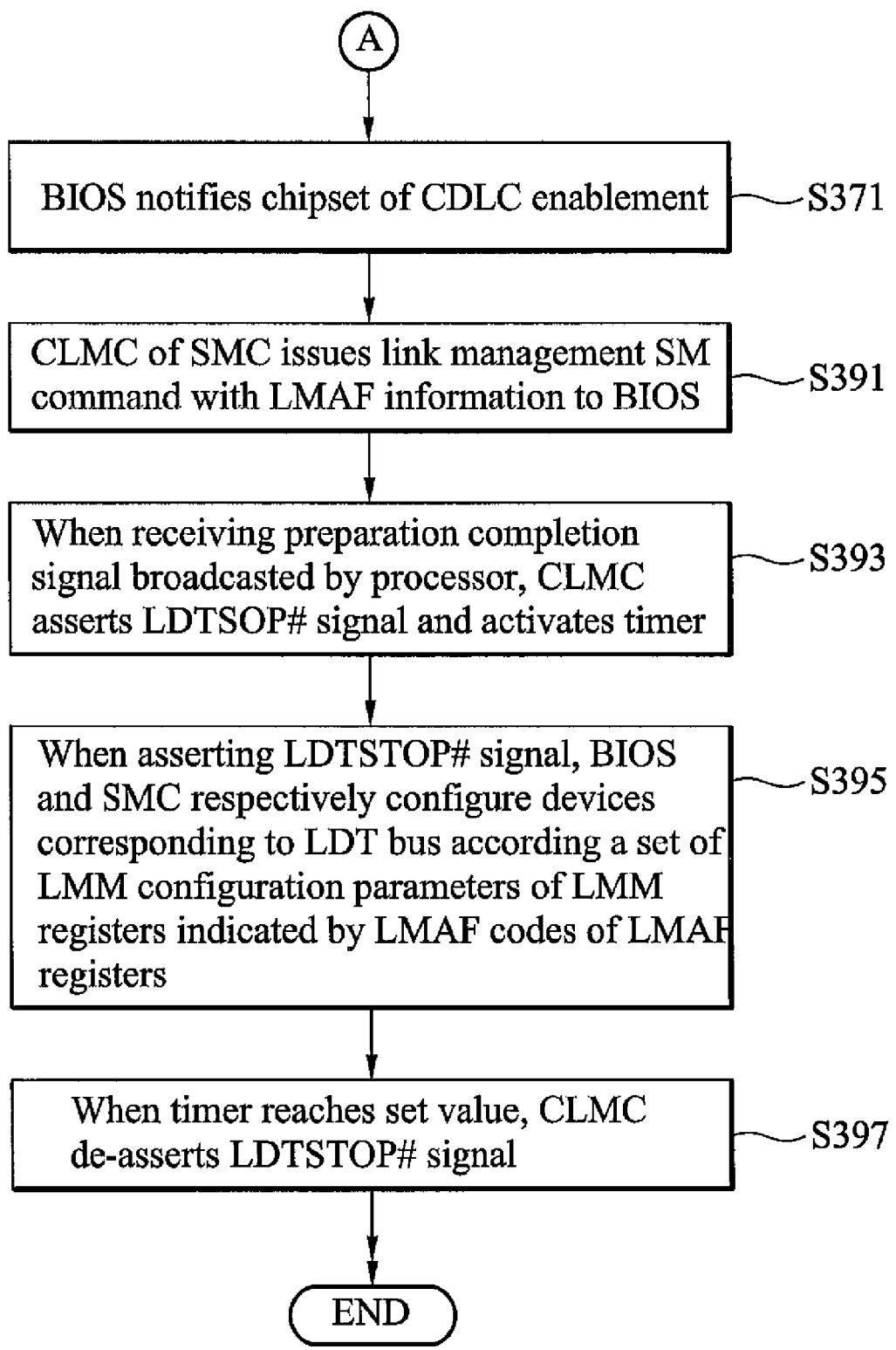
Figure 4:
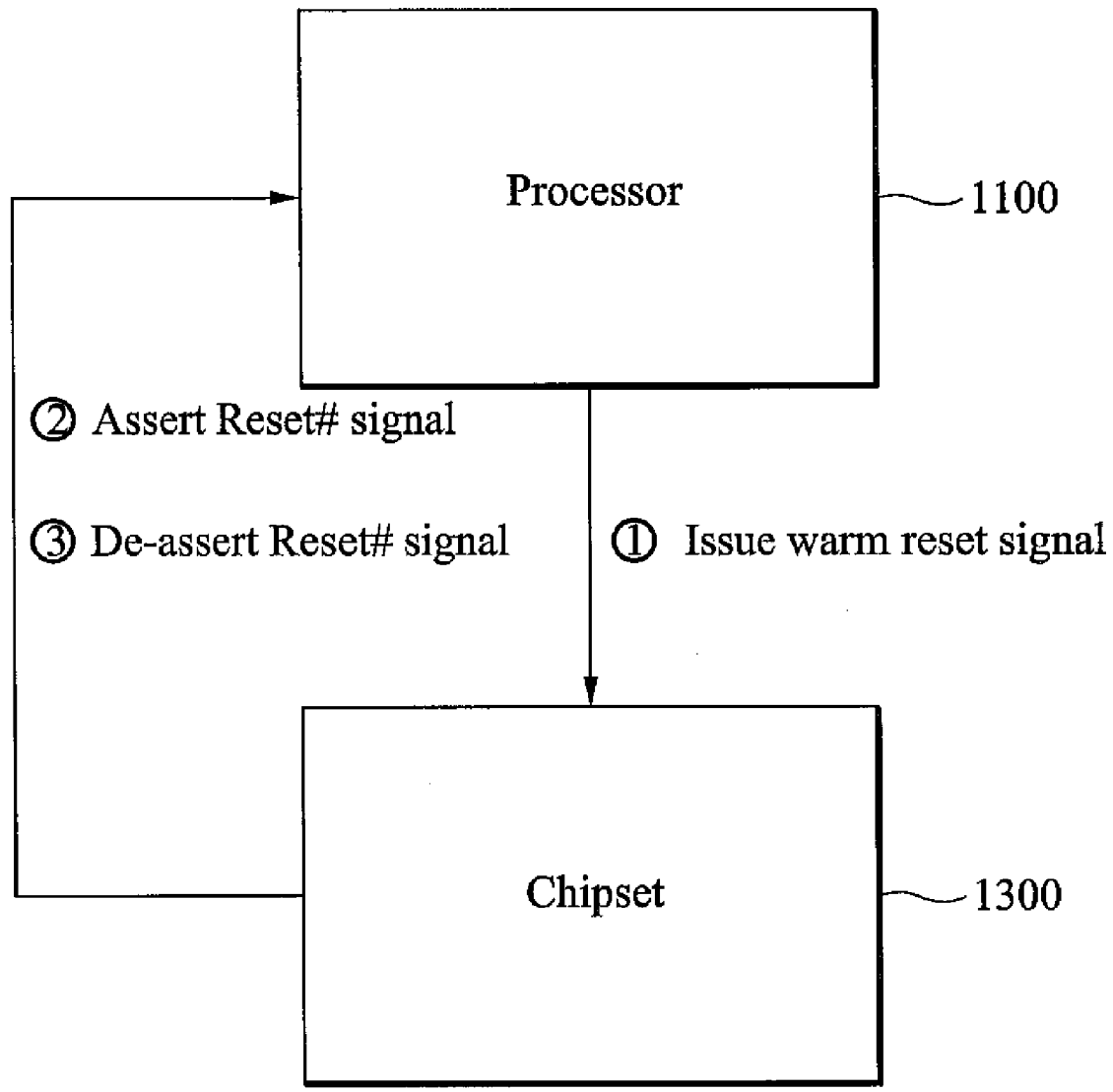
FIG. 4 is a diagram of an embodiment of a warm reset.

FIGS. 3A and 3B are flowcharts illustrating an embodiment of a method for CDLC, performed in a power on self test (POST) stage. In the POST stage, the arithmetic logic unit 1131 (FIG. 1) loads and executes a portion of program code of a basic input output system (BIOS) for completing CDLC functions. Those skilled in the art will understand that the BIOS is typically stored in non-volatile memory (not shown). The BIOS performs start-up procedures when a computer system is turned on. Two major procedures are typically provided to determine whether peripheral devices, such as keyboard, mouse, disk drives, video cards, or others, are available, and to load the operating system (OS) into main memory (not shown). After start-up (i.e. a POST stage), the BIOS manages data flow between the OS and the peripherals. In step S311, the computer system is powered on. In step S313, the BIOS configures the LDT bus to perform data transmission via Gen1 protocol. In step S331, the BIOS adjusts working frequencies of processor and chipset over 1 GHz. In step S333, the BIOS directs the chipset 1300 (FIG. 1) to perform a warm reset. The warm reset indicates assertion of the Reset# signal in power stable state, enabling to activate the new working frequency settings. FIG. 4 is a diagram of an embodiment of a warm reset. Specifically, the processor 1100 issues a warm reset signal to direct the chipset 1300 to assert the Reset# signal, a controller of the chipset 1300 subsequently asserts the Reset# signal, resulting in a full system reset. It is to be understood that, after completing full system reset, the Reset# signal is de-asserted, enabling the BIOS to perform subsequent steps. Referring to FIG. 3A, in step S335, BIOS configures the LDT bus to perform data transmission via Gen3 protocol. Those skilled in the art will understand that, contrary to Gen1 protocol, Gen3 protocol supports CDLC, and operates at a working frequency over 1 GHz.

In step S351, BIOS enables the LMAF mode of the processor, enabling the processor 1100 to execute CDLC, and sets a timer 1351 of the chipset 1300 (FIG. 1). Note that, after activating the timer 1351, the timer 1351 starts counting, and when the timer 1351 reaches the set value, a signal is issued to the SMC 1330. In addition, a time period corresponding to the set value is sufficient to ensure the processor 1100 and the chipset 1300 to complete the CDLC operation. In step S353, BIOS selects a particular set of LMM configuration parameters stored in the LMM register 1115 (FIG. 1) for the processor 1100, and selects a particular set of LMM configuration parameters stored in the LMM register 1315 (FIG. 1) for the chipset 1300. These two selected sets of LMM configuration parameters may have the same LMAF code (i.e. index value). In step S353, BIOS respectively writes the selected LMAF code to the LMAF registers 1113 and 1217 (FIG. 1).

Figure 5:
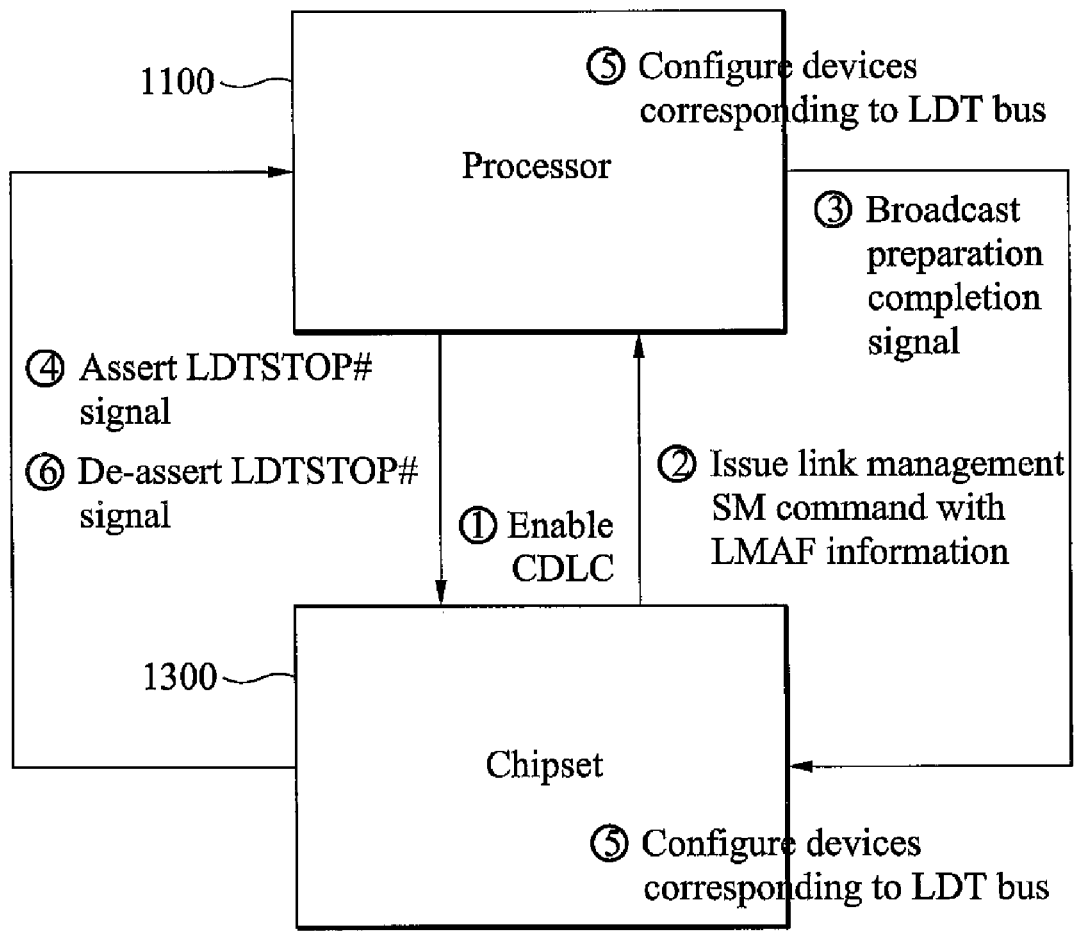
FIG. 5 is a diagram of an embodiment of a CDLC operation.

With reference to steps S371 to S397 of FIG. 3B, FIG. 5 is a diagram of an embodiment of a CDLC operation. In step S371, the BIOS notifies a chipset of CDLC enablement. In step S391, the CLMC 1331 of SMC 1330 (FIG. 1) issues a link management SM command with LMAF information to a processor. FIG. 6 is a diagram illustrating the data format of an embodiment of a link management SM command, where bit 0 stores information indicating whether CDLC is enabled, and bits 1 to 4 store LMAF code. In the issued link management SM command of step S391, bit 0 comprises information regarding CDLC enablement, and bits 1 to 4 store LMAF code in the LMAF register 1317 (FIG. 1). Referring to FIG. 3B, in step S393, when receiving a preparation completion signal broadcasted by the processor 1100, the CLMC 1331 asserts the LDTSOP# signal, and activates the timer 1351 (FIG. 1). Those skilled in the art will understand that, when asserting the LDTSTOP# signal, the processor 110 and the chipset 1300 cannot transmit data therebetween via the LDT bus. In step S395, when detecting that the LDTSTOP# signal is asserted, the BIOS configures devices corresponding to the LDT bus according a set of LMM configuration parameters of the LMM register 1115 (FIG. 1) indicated by LMAF code of the LMAF register 1113 (FIG. 1). In addition, the CLMC 1331 configures devices corresponding to the LDT bus according a set of LMM configuration parameters of the LMM register 1315 (FIG. 1) indicated by LMAF code of the LMAF register 1317 (FIG. 1). In step S397, when the timer 1351 reaches the set value, the CLMC 1331 de-asserts the LDTSTOP# signal, enabling the process 1100 and the chipset 1300 can transmit data therebetween via the LDT bus.

Figure 7:
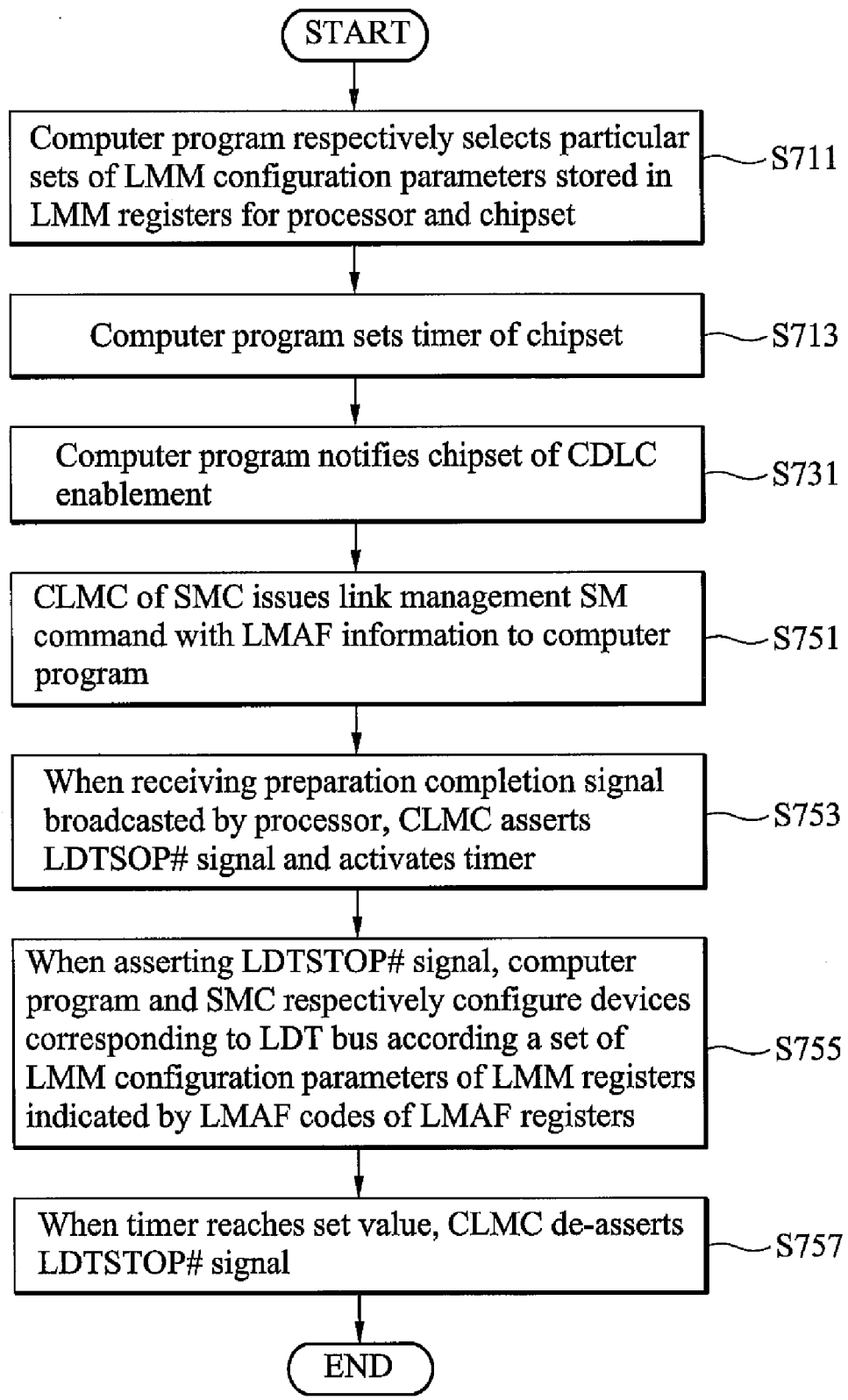
FIG. 7 is a flowchart illustrating an embodiment of a method for CDLC, performed in a runtime stage after completing the POST stage.

FIG. 7 is a flowchart illustrating an embodiment of a method for CDLC, performed in a runtime stage after completing the POST stage. In the runtime stage, the arithmetic logic unit 1131 (FIG. 1) loads and executes a computer program for completing CDLC functions. The computer program may be a BIOS, a driver, an OS, an application of an OS. Note that, after completing the POST stage, Gen3 protocol has already been employed in the LDT bus for data transmission, and the LMAF mode of the processor has been enabled. In step S711, the computer program selects a particular set of LMM configuration parameters stored in the LMM register 1115 (FIG. 1) for the processor 1100, and selects a particular set of LMM configuration parameters stored in the LMM register 1315 (FIG. 1) for the chipset 1300. These two selected sets of LMM configuration parameters may have the same LMAF code (i.e. index value). In step S713, the computer program sets the timer 1351 of the chipset 1300 (FIG. 1). A time period corresponding to the set value is sufficient to ensure that the processor 1100 and the chipset 1300 complete the entire CDLC operation. Details of steps S731 to S757 may refer the description of steps S371 to S397 of FIG. 3B, FIGS. 5 and 6.

Systems and methods, or certain aspects or portions thereof, may take the form of program code (i.e., instructions) embodied in tangible media, such as floppy diskettes, CD- ROMS, hard drives, or any other machine-readable storage medium, wherein, when the program code is loaded into and executed by a machine, such as a computer system and the like, the machine becomes an apparatus for practicing the invention. The disclosed methods and apparatuses may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. A method for centralized dynamic link configuration (CDLC), performed by a processor and a chipset, comprising:
    notifying the chipset of CDLC enablement by the processor;
    issuing a command to the processor by the chipset after receiving the notification of CDLC enablement;
    broadcasting a preparation completion signal by the processor after receiving the command;
    asserting a signal and activating a timer to start counting by the chipset after receiving the preparation completion signal;
    configuring devices of the processor, corresponding to a bus, by the processor according to one of a plurality of sets of first link management mode (LMM) configuration parameters in a first LMM register of the processor, indicated by first link management action field (LMAF) code in a first LMAF register of the processor, after detecting that the signal is asserted;
    configuring devices of the chipset, corresponding to the bus, by the chipset according to one of a plurality of sets of second LMM configuration parameters in a second LMM register of the chipset, indicated by second LMAF code in a second LMAF register of the chipset, when asserting the signal; and
    de-asserting the signal by the chipset when the timer reaches a predetermined value.

2. The method as claimed in claim 1 wherein the processor and the chipset cannot transmit data therebetween via the bus when the signal is asserted.

3. The method as claimed in claim 1 wherein a time period corresponding to the predetermined value is sufficient to ensure that the processor completes device configuration corresponding to the bus, and the chipset completes device configuration corresponding to the bus.

4. The method as claimed in claim 1 wherein the first LMAF code is the same as the second LMAF code.

5. The method as claimed in claim 1 wherein one set of first LMM configuration parameters comprises a lane state of a pin set of a transmitter of the processor, corresponding to the bus, or a lane state of a pin set of a receiver of the processor, corresponding to the bus, and one set of second LMM configuration parameters comprises a lane state of a pin set of a transmitter of the chipset, corresponding to the bus, or a lane state of a pin set of a receiver of the chipset, corresponding to the bus.

6. The method as claimed in claim 1 further comprising setting the timer to the predetermined value by the processor before notifying the chipset of CDLC enablement by the processor.

7. The method as claimed in claim 1 wherein the command comprises the second LMAF code.

8. The method as claimed in claim 1, before notifying the chipset of CDLC enablement by the processor, further comprising:
    storing the first LMAF code in the first LMAF register by the processor; and
    storing the second LMAF code in the second LMAF register by the processor.

9. The method as claimed in claim 1, before notifying the chipset of CDLC enablement by the processor, further comprising:
    configuring the bus to perform data transmission in a first protocol by the processor;
    adjusting working frequencies of the processor and the chipset over 1 GHz;
    directing the chipset to perform a warm reset by the processor;
    configuring the bus to perform data transmission in a second protocol by the processor, the second protocol been used in the working frequencies over 1 GHz;
    enabling a LMAF mode by the processor, thereby enabling that the processor can execute CDLC;
    setting the predetermined value of the timer by the processor;
    storing the first LMAF code in the first LMAF register by the processor; and
    storing the second LMAF code in the second LMAF register by the processor.

10. A system for centralized dynamic link configuration (CDLC), comprising:
    a processor, comprising:
        a first link management action field (LMAF) register storing a first LMAF code;
        a first link management mode (LMM) register storing a plurality of sets of first LMM configuration parameters; and
        an arithmetic logic unit coupling to the first LMAF register and the first LMM register, loading and executing a computer program; and
    a chipset, connecting to the processor via a bus, and comprising:
        a timer;
        a second LMAF register storing a second LMAF code;
        a second LMM register storing a plurality of sets of second LMM configuration parameters; and
        a system management controller (SMC) coupling to the timer, the second LMAF register and the second LMM register,
    wherein the computer program notifies the SMC of CDLC enablement, the SMC issues a command to the computer program after receiving the notification of CDLC enablement, the computer program broadcasts a preparation completion signal after receiving the command, the SMC asserts a signal and activates the timer to start counting after receiving the preparation completion signal, the computer program configures devices of the processor, corresponding to the bus, according to one of a plurality of sets of first LMM configuration parameters in the first LMM register of the processor, indicated by first LMAF code in the first LMAF register of the processor after detecting that the signal is asserted, the SMC configures devices of the chipset, corresponding to the bus, according to one of a plurality of sets of second LMM configuration parameters in the second LMM register of the chipset, indicated by second LMAF code in the second LMAF register of the chipset when asserting the signal, and the SMC de-asserts the signal when the timer reaches a predetermined value.

11. The system as claimed in claim 10 wherein the computer program is a basic input output system (BIOS), a operating system (OS), an application of the OS, or a driver.

12. The system as claimed in claim 10 wherein the processor and the chipset cannot transmit data therebetween via the bus when the signal is asserted.

13. The system as claimed in claim 10 wherein a time period corresponding to the predetermined value is sufficient to ensure that the computer program completes device configuration corresponding to the bus, and the SMC to complete device configuration corresponding to the bus.

14. The system as claimed in claim 10 wherein the first LMAF code is the same as the second LMAF code.

15. The system as claimed in claim 10 wherein one set of first LMM configuration parameters comprises a lane state of a pin set of a transmitter of the processor, corresponding to the bus, or a lane state of a pin set of a receiver of the processor, corresponding to the bus, and one set of second LMM configuration parameters comprises a lane state of a pin set of a transmitter of the chipset, corresponding to the bus, or a lane state of a pin set of a receiver of the chipset, corresponding to the bus.

16. The system as claimed in claim 10 wherein the computer program sets the timer to the predetermined value before notifying the SMC of CDLC enablement.

17. The system as claimed in claim 10 wherein the command comprises the second LMAF code.

18. The system as claimed in claim 10 wherein, before the computer program notifies the chipset of CDLC enablement, the computer program stores the first LMAF code in the first LMAF register, and stores the second LMAF code in the second LMAF register.

19. The system as claimed in claim 10 wherein, before the computer program notifies the chipset of CDLC enablement, the computer program configures the bus to perform data transmission in a first protocol, adjusts working frequencies of the processor and the chipset over 1 GHz, directs the chipset to perform a warm reset, and then, configures the bus to perform data transmission in a second protocol, the second protocol is used in the working frequencies over 1 GHz, the computer program enables a LMAF mode, thereby enabling that the processor can execute CDLC, the computer program sets the predetermined value of the timer, stores the first LMAF code in the first LMAF register, and stores the second LMAF code in the second LMAF register after configuring the bus to perform data transmission in the second protocol.

20. The system as claimed in claim 19 wherein the computer program is a basic input output system (BIOS).

* * * * *